United States Patent [19]
Ross

[11] 3,729,640
[45] Apr. 24, 1973

[54] SUPERCONDUCTING ELECTRICAL MACHINES

[75] Inventor: John Sterry Hawley Ross, Newcastle upon Tyne, England

[73] Assignee: International Research & Development Company, Limited

[22] Filed: Feb. 16, 1971

[21] Appl. No.: 115,653

[52] U.S. Cl. ................................................. 310/52
[51] Int. Cl. ........................................... H02k 9/00
[58] Field of Search ................. 310/55, 52, 40, 54, 310/56, 57, 58, 59, 61, 64, 265, 10; 62/505, 475

[56] References Cited

UNITED STATES PATENTS

| | | |
|---|---|---|
| 3,517,231 | 6/1970 | Massar ................................ 310/52 |
| 3,368,087 | 2/1968 | Madsen ............................... 310/52 |
| 3,440,456 | 4/1969 | Grunwald ............................ 310/52 |
| 3,521,091 | 7/1970 | Halas .................................. 310/52 |
| 3,478,232 | 11/1969 | Eder .................................... 310/40 |
| 2,986,905 | 6/1961 | Kocher ................................ 62/475 |

Primary Examiner—R. Skudy
Attorney—Kemon, Palmer & Estabrook

[57] ABSTRACT

A synchronous electrical generator having a rotor with a superconducting winding and coolant ducts for the winding and for the end part of the rotor, liquid helium being supplied to the winding coolant ducts through a radial passage and the heat generated by centrifugal action on the liquid passing through the passage being conducted back to the radially inner end of the passage and dissipated in the liquid cooling the end part of the rotor.

5 Claims, 1 Drawing Figure

Patented April 24, 1973  3,729,640
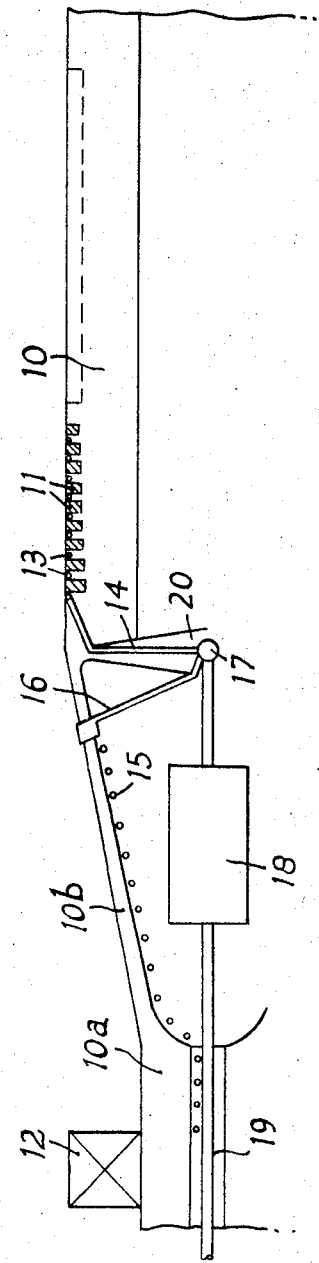

SUPERCONDUCTING ELECTRICAL MACHINES

This invention relates to superconducting electrical machines.

In the co-pending U.S. Pat. Application Ser. No. 43693 filed June 5, 1970 now U.S. Pat. No. 3,648,082 there is described a synchronous electrical machine in which the rotor carries a superconducting field winding which is supplied with d.c. excitation. The stator winding is non-superconducting and constitutes the armature winding. Cryogenic fluid such as liquid helium is used to reduce the temperature of the rotor winding to temperatures at which the rotor winding becomes superconducting, usually temperatures of the order of 5° K. Such fluid can be produced in a refrigerator outside the machine or part of the refrigerating equipment such as turbo-expanders may be located within the rotor so as to rotate therewith. In the latter case the equipment is preferably located coaxial with the rotor axis to minimize centrifugal and gyroscopic forces. Cryogenic fluid can also be used to cool axially outer parts of the rotor body to produce a thermal resistance between the winding and the rotor shaft to restrict ingress of heat along the shaft into the winding.

If the path for cryogenic fluid to the rotor winding is radially outwards as it will be in most instances especially when the refrigerating equipment is located around the axis of the machine, there is an increase in pressure in the fluid as it passes to the winding and this results in a heating up of the fluid. A heating up of the fluid of one or two degrees can be serious because of the increased amount of refrigeration work required.

In accordance with the present invention there is provided a superconducting electrical machine comprising a hollow rotor having a central part and two end parts joining the central part to rotor shafts which are supported in bearings, a superconducting winding carried by the central part of the rotor, winding cooling ducts for circulating cryogenic fluid to cool the winding, wall cooling ducts for circulating cryogenic fluid to cool the wall of one end part of the rotor, supply means for supplying cryogenic fluid, a first passage extending generally radially from the supply means to the winding cooling ducts, a second passage extending from the supply means to the wall cooling ducts, and heat transfer means for conveying heat from the radially outer end of the first passage to the supply means to dissipate this heat in cryogenic fluid fed to the second passage.

When the first and second passages have a common junction with the supply means, the heat transfer means extends from the radially outer end of the first passage to the said junction.

The heat transfer means is preferably a solid member of high thermal conductivity.

The invention will be described in more detail with the aid of an example illustrated in the accompanying drawing, which is a longitudinal section of part of the rotor of a synchronous generator in accordance with the present invention.

The rotor comprises a body or central part 10 carrying a rotor winding 11 of superconducting material such as niobium-titanium alloy. The rotor further comprises a rotor shaft 10a joined to one end of the central part 10 by a hollow end part 10b of conical form. The rotor shaft 10a and a similar shaft (not shown) at the other end of the rotor are mounted in bearings 12.

Coolant ducts 13 are associated with the winding 11 and are supplied with cryogenic fluid, such as liquid helium, through a radial passage 14. The end part 10b of the rotor is also provided with coolant ducts 15 to minimize the inflow of heat to the winding along the wall of the end part 10b. The coolant ducts 15 are supplied with cryogenic fluid through a passage 16 which also extends generally radially of the rotor. The inner ends of the passages 14 and 16 have a common junction 17 with a source 18 of cryogenic fluid which comprises refrigeration equipment mounted about the axis of the rotor and connected by a conduit 19 to further refrigeration equipment outside the rotor. For details of the construction and arrangement of the cryogenic source 18, which is only shown diagrammatically in the drawing, reference is made to the above-mentioned co-pending application, which also shows constructional details of other parts of the present machine.

In an alternative construction the refrigeration equipment is mounted wholly outside the rotor and cryogenic fluid is fed to the interior of the rotor by the conduit 19. In either case liquid helium is supplied to the junction 17 of the passages 14 and 16 at a temperature of about 5° K. The major portion of the liquid flows along the passage 16 to the coolant ducts 15. Liquid entering the passage 14 flows radially outwards to the coolant ducts 13 in the winding 11 and its pressure is increased by the action of centrifugal forces due to the rotation of the rotor.

As a result, the liquid heats up by two or three degrees and this is undesirable because the winding is raised above its operating temperature. To counteract the heating effect, heat transfer means are provided in the form of a solid member 20 of high thermal conductivity material such as aluminum or copper which extends from the outer end of the passage 14 to the inner end and thus conducts heat back to the junction 17. This heat is dissipated in the much larger quantity of liquid being fed from the junction 17 through the passage 16 to the coolant ducts 15 and results in a much lower temperature increase in this liquid. The temperature of the liquid in the ducts 15 is in any case less critical since it serves solely to cool the end part 10b of the rotor and thus provide a thermal resistance between the winding and the rotor shaft to restrict inflow of heat to the winding.

The arrangement shown can, if necessary, be duplicated at the other end of the rotor and at each end there can be more than one of the passages 14 and 16 with the associated heat transfer member 20.

By using the end part 10b as a thermal resistance the bearing 12 can operate at normal ambient temperature, for example 300° K.

What is claimed is:

1. In a superconducting electrical machine, a hollow rotor having a cylindrical center part, two conical end parts, and rotor shafts jointed to said central part by said end parts, bearings supporting said rotor shafts, a superconducting winding carried by said central part of the rotor, winding cooling ducts in heat exchange relation with said winding for circulating cryogenic fluid to cool said winding, wall cooling ducts in heat exchange relation to one of said conical end parts for circulating cryogenic fluid to cool the wall of one end part of the rotor, supply means for supplying cryogenic fluid, a first passage extending generally radially from said supply means to said winding cooling ducts, a second passage extending from said supply means to said wall cooling ducts, and heat transfer means for conveying heat from the radially outer end of said first passage to said supply means to dissipate heat from said windings in cryogenic fluid fed to said second passage.

2. A machine as claimed in claim 1 in which said heat transfer means comprise a solid member of high thermal conductivity.

3. A machine as claimed in claim 1, wherein said first and second passages have a common junction with said supply means and said heat transfer means extends between this common junction and said radially outer end of the first passage.

4. A machine as claimed in claim 3 in which said heat transfer means comprise a solid member of high thermal conductivity.

5. A machine as claimed in claim 1, wherein the said supply means includes refrigeration equipment located within the rotor.

* * * * *